A. M. & J. W. THOMPSON.
COTTON CHOPPER AND CULTIVATOR.
APPLICATION FILED MAR. 27, 1908.

914,617.

Patented Mar. 9, 1909.
3 SHEETS—SHEET 1.

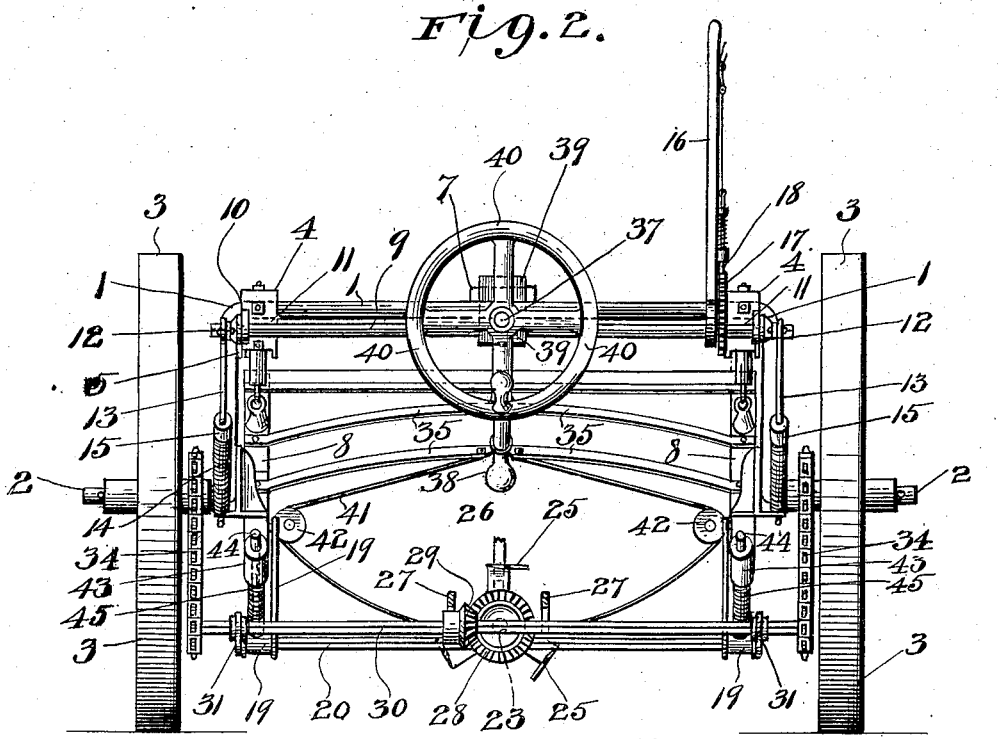
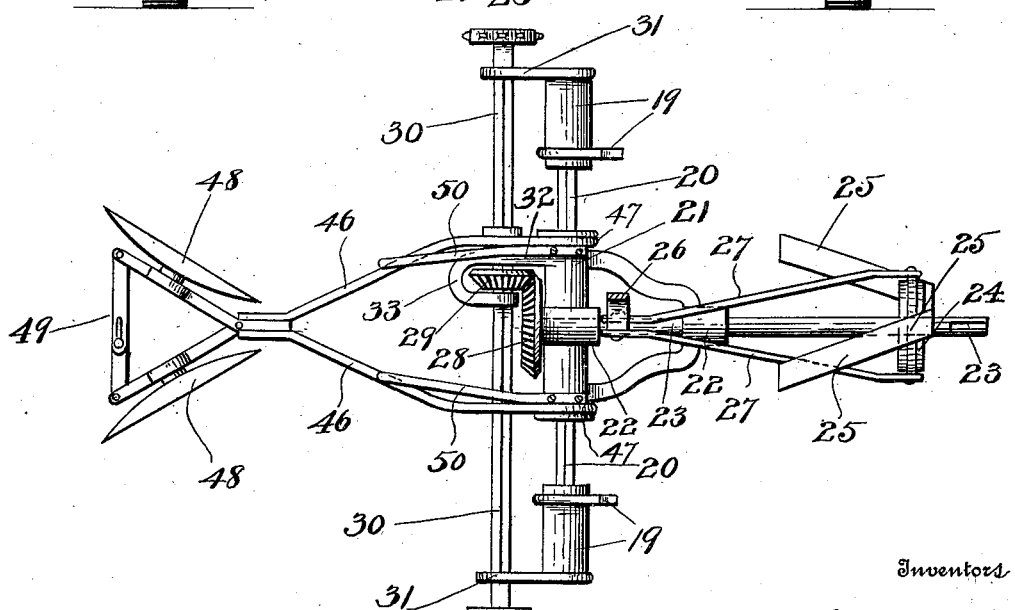

A. M. & J. W. THOMPSON.
COTTON CHOPPER AND CULTIVATOR.
APPLICATION FILED MAR. 27, 1908.
914,617.
Patented Mar. 9, 1909.
3 SHEETS—SHEET 3.
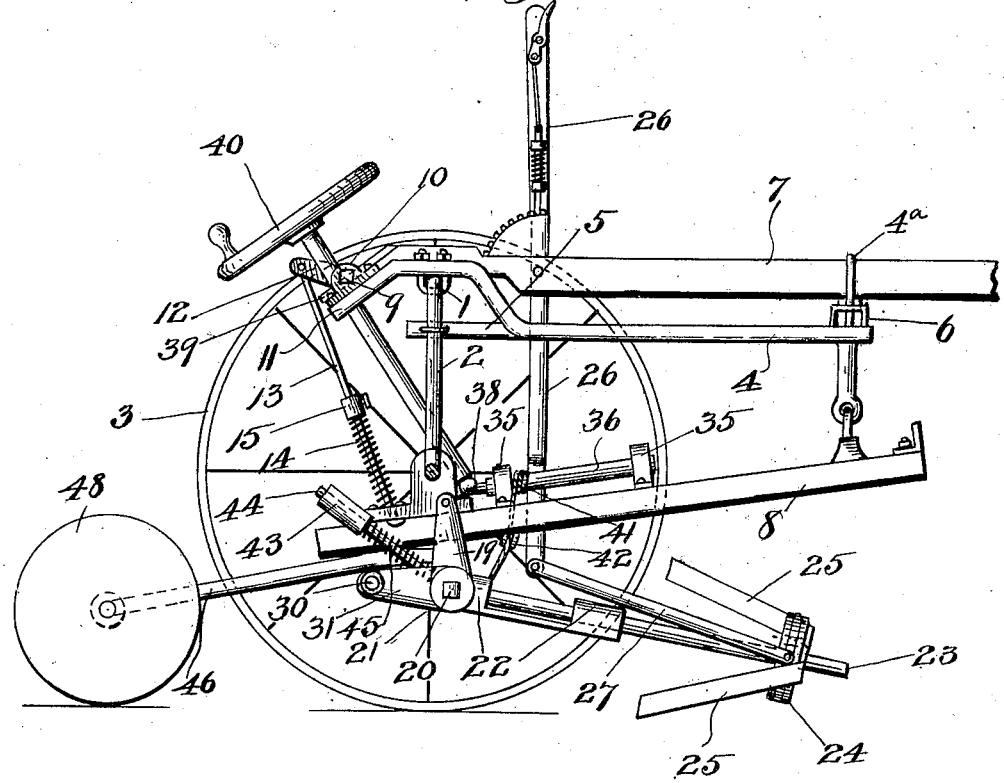

UNITED STATES PATENT OFFICE.

ANDREW M. THOMPSON AND JAMES W. THOMPSON, OF ANADARKO, OKLAHOMA.

COTTON CHOPPER AND CULTIVATOR.

No. 914,617.      Specification of Letters Patent.      Patented March 9, 1909.

Application filed March 27, 1908. Serial No. 423,693.

*To all whom it may concern:*

Be it known that we, ANDREW M. THOMPSON and JAMES W. THOMPSON, citizens of the United States, residing at Anadarko, in the county of Caddo and State of Oklahoma, have invented certain new and useful Improvements in Cotton Choppers and Cultivators, of which the following is a specification.

Our invention relates to machines for thinning growing plants and has for its object the provision of a machine simple in construction, effective in operation and reasonable in cost of manufacture.

The construction and operation of our improved machine will be described in detail hereinafter and illustrated in the accompanying drawings in which—

Figure 1:
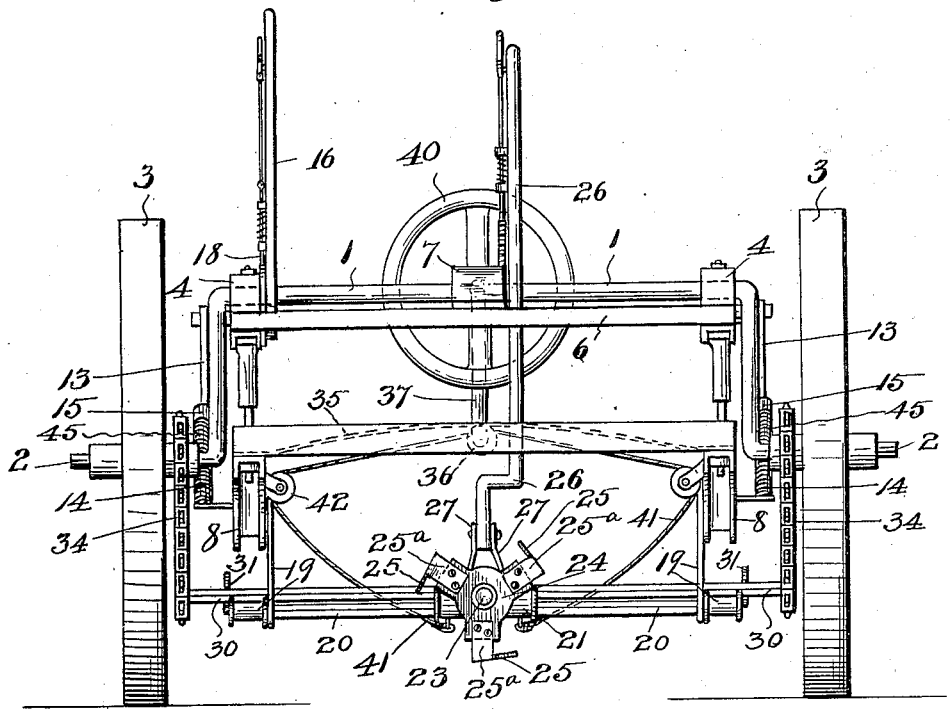
Figure 6:
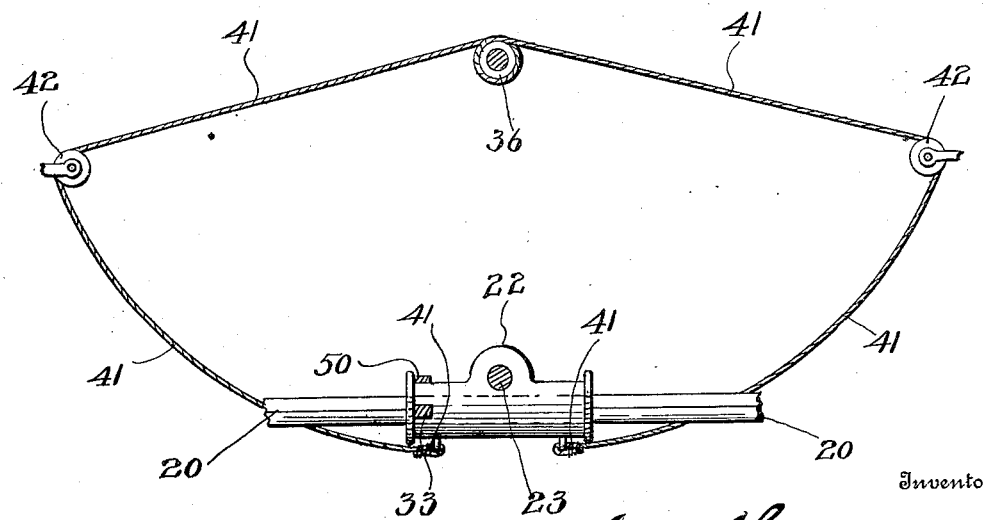

Figure 1 is a front view of our improved machine, Fig. 2, a rear view, Fig. 3, a side view, Fig. 4, a detail plan view of the chopper and cultivator and operating mechanism, Fig. 5, an enlarged front view of the chopping wheel, and Fig. 6, a detail view of the mechanism for shifting the chopper, etc., laterally.

In the drawings similar reference characters indicate corresponding parts throughout the several views.

The axle 1 of our improved machine is arch or U-shaped as shown and has the ends turned horizontally as shown at 2 to form bearings for the traction wheels 3.

4 indicates beams secured to the upper portion of axle 1 and extending toward the front of the machine, said beams being braced by means of rods 5 secured thereto and to the upright portions of the axle 1.

6 indicates a cross-beam secured to the front ends of beams 4, and 7 the draft beam secured to cross-beam 6 by means of strap 4ª and to axle 1.

8 indicates beams having their front ends suspended from the front ends of beams 4.

9 indicates a shaft journaled in bearings 10 secured to rearward extensions 11 of beams 4, said shaft 9 having cranks 12 on its ends with rods 13 pivotally secured thereto and loosely secured in the rear ends of beams 8.

14 indicates coil springs mounted on rods 13 and bearing against the ends of the beams 8 and sleeves 15 secured to said rods 13.

16 indicates a lever secured to shaft 9 and 17 a segmental ratchet secured to one of the extensions 11 and adapted to be engaged by pawl 18 on lever 16.

It will be understood from this construction that the height of the rear end of beams 8 may be adjusted by means of lever 16 through shaft 9 and rods 13 so as to raise and lower the chopping attachment, to be hereinafter described, to adjust the depth of the cut as well as to raise it and the cultivator blades in turning at the ends of rows and going to and from the field.

19 indicates brackets pivotally secured near the ends of beams 8 and having a rectangular bar 20 secured in their free ends on which is slidably mounted casing 21 having journal bearings 22 in which is journaled shaft 23 carrying the wheel 24 on which are secured the chopping blades 25, said blades consisting of flat bars of metal as shown having their front ends bent at substantially right angles to the blades 25 as shown at 25ª and secured to the wheel 24, the horizontal cutting edges being bent to one side of the line of draft so that they make a slicing cut when in operation. Wheel 24 is splined on shaft 23 so as to permit adjustment thereof, said adjustment being accomplished by means of lever 26 fulcrumed on draft beam 7 and pivotally secured to rods 27 which are in turn swivelly secured to said wheel 24.

The rear end of shaft 23 has a beveled gear wheel 28 keyed thereto that meshes with beveled gear wheel 29 mounted on rectangular shaft 30 journaled in bearings 31, secured to the ends of rectangular bar, 20, and in projection 32 extending rearwardly from casing 21, said gear wheel 29 being mounted on shaft 30 so that it rotates with the shaft and slides longitudinally thereof with casing 21 when adjusted on bar 20 by the instrumentalities hereinafter described in following crooked rows of plants, said gear wheel 29 being inclosed by projection 32 on one side and a U-shaped extension 33 formed integral therewith so that it is always held in mesh with gear wheel 28. The shaft 30 is rotated by chain and sprocket gearings 34 connecting it with the traction wheels 3.

35 indicates arch-shaped bars connecting beams 8, 36 a roller journaled thereon and 37 a shaft secured to roller 36 by means of universal joint 38 and journaled in bearing 39 extending from the rear end of draft beam 7, 40 indicating a hand wheel for rotating shaft 37 and roller 36.

41 indicates cables secured at one end to casing 21, engaging pulleys 42 secured to beams 8 and having their other ends secured to roller 36 so that when said roller 36 is rotated the casing 21 is adjusted on bar 20 so as to follow irregularities in the row of plants as stated above without requiring the machine to be turned out of its course. This construction enables the operator to let the animals walk between the rows of plants while he guides the cutting attachment as needed.

43 indicates sockets on the rear ends of beams 8 and 44 rods secured to the ends of brackets 19 and slidably mounted in said sockets, 45 indicating coil springs secured to sockets 43 and brackets 19 and forming cushions to permit slight play of the cutting attachment above described while in operation.

46 indicates bars having loops 47 on their front ends secured on casing 21 and curved over shaft 30.

48 indicates disks secured to mountings 49 at the rear ends of bars 46, said mountings being pivotally secured together at their front ends and having their rear ends adjustably secured together so that the angle of the cut of the disks may be adjusted to the line of the draft as desired by the operator.

50 indicates leaf springs secured to casing 21 and bearing against the tops of bars 46 to hold the cultivator disks down to their work.

Having thus described our invention what we claim is—

1. In a cotton chopper, the chopping shaft extending in the direction of draft and having its front end free, a chopping wheel adjustably mounted on said shaft, the chopping blades having their front ends bent at right angles to the blades and secured to said wheel, and the blades extended rearwardly from the wheel on planes substantially parallel with the chopping shaft and obliquely to the line of draft.

2. In a cotton chopper, a wheeled frame, a rectangular shaft carried by said frame and actuated by gearing connected with said wheels, a beveled gear wheel slidably mounted on said shaft, a casing slidably mounted on the shaft and inclosing said gear wheel, a shaft journaled on said casing and having a beveled pinion secured thereto and meshing with the beveled gear wheel aforesaid, the chopping blades carried by said shaft, and means to slide the casing on the rectangular shaft to adjust the chopping blades laterally.

3. In a cotton chopper, a wheeled frame, a frame pivotally secured to said wheeled frame, a rectangular shaft journaled in said pivoted frame and geared to the wheels of the wheeled frame, a beveled gear wheel slidably mounted on said shaft, a casing slidably mounted on the shaft and inclosing said gear wheel, a shaft journaled on said casing and having a beveled pinion secured thereto and meshing with the beveled gear wheel aforesaid, a wheel slidably mounted on the last mentioned shaft, the chopping blades secured to said wheel, means to adjust the wheel on the shaft, mechanism to adjust the casing on the rectangular shaft, and means to adjust the pivoted frame.

4. In a cotton chopper, a wheeled frame, a frame pivotally secured to said wheeled frame and arranged to swing through a vertical plane, a rectangular shaft journaled in said pivoted frame and geared to the wheels of the wheeled frame, a beveled gear wheel slidably mounted on said shaft, a casing slidably mounted on the shaft and inclosing said gear wheel, a roller journaled on the pivoted frame, a shaft operatively connected to said roller, cables secured to the roller and to the casing to slide the casing on the rectangular shaft, a shaft journaled on said casing and having a beveled pinion secured thereto and meshing with the beveled gear wheel aforesaid, a chopping wheel splined on the last mentioned shaft, the chopping blades secured to said wheel, said chopping blades extending on planes parallel with the shaft and obliquely to the line of draft, a lever fulcrumed on the wheeled frame and secured to the chopping wheel, and a lever to adjust the pivotally secured frame on the wheeled frame.

In testimony whereof we hereto affix our signatures in the presence of two witnesses.

ANDREW M. THOMPSON.
JAMES W. THOMPSON.

Witnesses:
WAVERLY B. CHANEY,
B. F. HOLDING.